C. J. WITZEL.

WIRE MATTRESS.

APPLICATION FILED JUNE 12, 1909.

Reissued June 28, 1910. 13,125.

Witnesses:

G. C. Fiss.

H. D. Penney

Inventor:

Charles J. Witzel,

By his Attorney,

F. H. Richards.

UNITED STATES PATENT OFFICE.

CHARLES J. WITZEL, OF NEW YORK, N. Y.

WIRE MATTRESS.

13,125. Specification of Reissued Letters Patent. Reissued June 28, 1910.

Original No. 921,494, dated May 11, 1909, Serial No. 482,919. Application for reissue filed June 12, 1909. Serial No. 501,884.

*To all whom it may concern:*

Be it known that I, CHARLES J. WITZEL, a citizen of the United States of America, residing in New York, in the borough of Brooklyn, county of Kings, and State of New York, have invented certain new and useful Improvements in Wire Mattresses, of which the following is a specification.

This invention relates to an improvement in spring and woven wire mattresses, by which the hair or other mattresses that are supported on the same are held in position thereon and prevented from shifting to one side or the other.

It is one of the objections to the metallic bedsteads in general use that the hair or other mattresses which are placed on the wire mattresses shift on the same from one side to the other, or so spread in use that a very unsightly appearance is the result.

The object of this invention is to obviate the shifting or spreading of the hair or other mattresses on the wire mattresses by holding the same securely in position on the wire mattress and prevent, in a reliable manner, the unsightly shifting or spreading of the hair mattress on the same; and for this purpose the invention consists of a wire mattress which is provided at both sides, in the preferred form, with bent up longitudinal guards which are reinforced by heavier strands along the side edges of the wire mattress and at the upper edges of the bent up guards, said bent up guards being attached to bent up lugs on the transverse end straps of the wire mattress, and the bent up lugs connected by coiled springs with auxiliary lugs which are attached to the metallic cross or transverse bars or irons at the ends of the wire mattress by which the same is supported on the bedstead.

Figure 1:
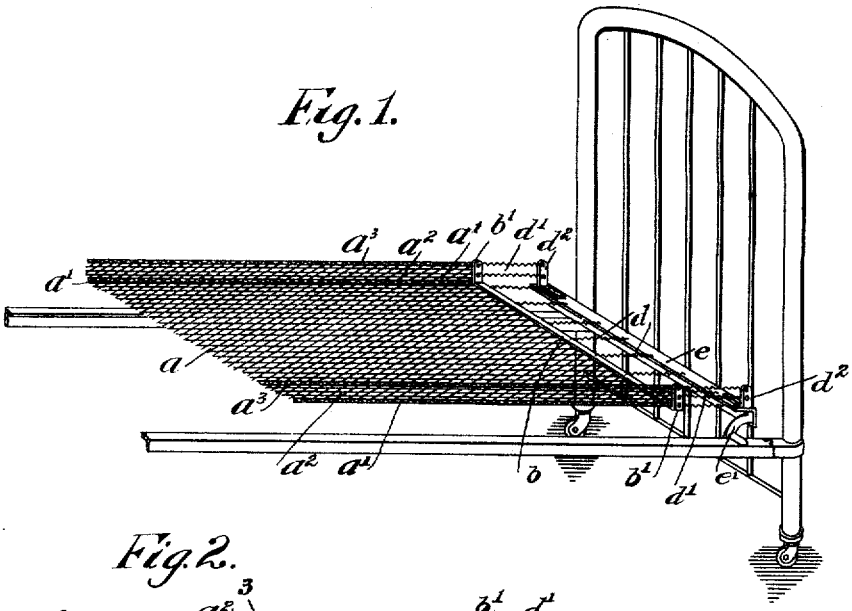
Figure 2:
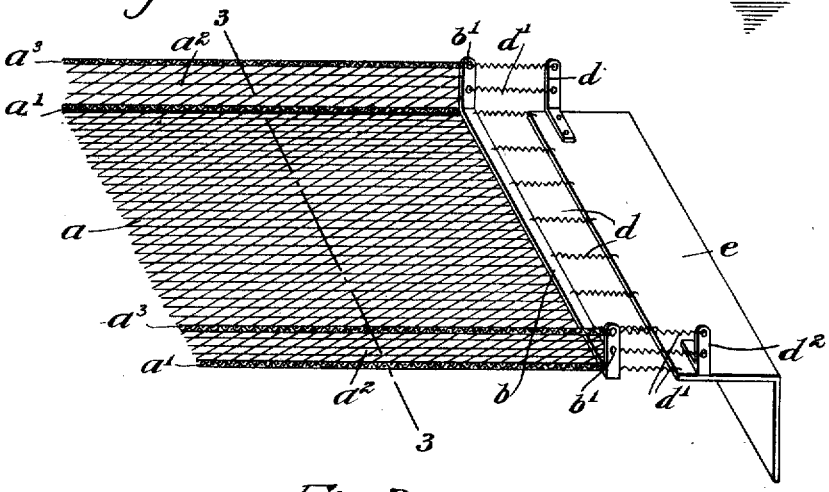
Figure 3:
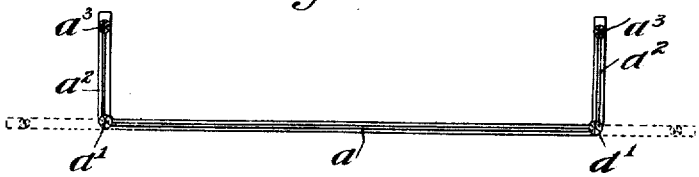

In the drawings accompanying and forming part of this specification, Figure 1 represents a perspective view of a metallic bedstead with my improved wire mattress placed in position on the same; Fig. 2 is a perspective view of one end of the wire mattress, drawn on a larger scale; and Fig. 3 is a vertical transverse section on line 3—3, Fig. 2.

Similar characters of reference indicate corresponding parts in the figures of the drawing.

Referring to the drawing, $a$ represents a woven wire mattress of any approved construction. The longitudinal edges of the woven wire mattress $a$ are reinforced by thick strands $a^1$. Cross straps $b$ are attached to the opposite ends of the woven wire mattress and connected in the usual manner by coiled springs $d$ with the transverse members or irons shown as angular head or foot piece $e$ of the mattress, by which the latter is supported by the usual brackets $c^1$ secured to the side rails of the metallic bedstead. The woven wire mattress $a$ is shown woven beyond the reinforcing strands $a^1$ for a distance of approximately two inches, the edges being reinforced by additional strands $a^3$. Both longitudinal extensions or guards $a^2$ at the sides of the wire mattress are bent up at right angles to the body of the mattress and attached to lugs $b^1$ that are bent up from the cross straps $b$. The bent up lugs $b^1$ are connected by auxiliary coil springs $d^1$ with auxiliary angular lugs $d^2$, which are attached to the angle irons $e$ at the head and foot of the wire mattress, as shown in Fig. 2. The auxiliary springs $d^1$ serve to keep the bent up guards $a^2$ rigidly in taut position in the same manner as the coil springs $d$ keep the main portion or web of the woven wire mattress in tightly stretched position.

The bent up guards $a^2$ with their reinforcing strands $a^3$ keep the hair or other mattress in position when the same is placed on the woven wire mattress and prevent the lateral shifting or spreading of the same; while the hair mattress has some longitudinal play between the head and foot pieces of the metallic bedstead, the lateral shifting or spreading of the hair mattress is prevented and the same held always in proper position between the side guards. The unsightly and disagreeable shifting or spreading of the stuffed mattress is thereby prevented. The longitudinal side guards add but little to the expense of the woven wire mattress, which is shipped in the same manner as ordinary wire mattresses, the tension springs preventing the mattress and its side guards from getting out of shape.

It will be obvious that the various details may be more or less modified without departing from the spirit or scope of this improvement. It will also be apparent that when the side guards are made of a metallic fabric, of woven wire or other form thereof, and when bent up from the mattress bottom or have their edges connected thereto in any suitable manner, any portions of the stuffed mattress will be prevented from bulging beyond the side guards, so that the stuffed mattress will be maintained in its original box-like form and shape and its life thereby prolonged, since it will be unnecessary to have the mattress re-made as is now frequently the case when the same has been used for even a short length of time. Furthermore it will also be apparent that the reinforced or enlarged upper edge materially stiffens the side guard, and when made in this manner, and as shown, it materially assists in maintaining the side guard under tension and in its upright position; and furthermore, that by having the side guard of less height than the stuffed mattress it follows that when the latter is compressed somewhat in use the side guard will not come above the level of the mattress and so interfere with sitting upon the side of the bed or with the proper tucking in of the bed clothes. In short, by having the side guard made of a suitable metallic fabric and of a height substantially no higher than the stuffed mattress it not only reinforces the life of the spring, but the stuffed mattress will retain its straight and box-like appearance and be prevented from rolling and spreading at the edge and bulging in the center, while it also materially assists in holding a two-part mattress together, for the reason that the mattress cannot stretch and consequently when the bed is made up it always maintains its neat and tidy appearance.

I claim as my invention:

1. A woven wire mattress provided with bent up side guards forming extensions of the body or web of the mattress, transverse end straps applied to the woven wire mattress and provided with bent up lugs to which the side guards are attached, auxiliary angular lugs attached to the angle irons at the foot and head of the mattress, coil springs between the transverse end straps and angle irons, and coil springs between the bent up lugs of the end straps and the auxiliary lugs of the angle irons.

2. In a woven wire mattress, the combination with a woven wire web having bent up extensions or guards at the sides, of longitudinal strands for reinforcing the edges of the web and bent up guards, transverse end straps having bent up lugs attached to opposite ends of the web and side guards, angle irons at the head and foot of the mattress, auxiliary lugs attached to said angle irons in line with the lugs of the transverse straps, coil springs interposed between the transverse end straps and angle pieces, and auxiliary coil springs between the bent up lugs and auxiliary lugs.

3. A woven wire mattress provided with reinforcing strands at both longitudinal sides, bent up side guards forming extensions of the wire mattress and also provided at their upper edges with reinforcing strands, and transverse end straps connected to the ends of the mattress and provided with bent up lugs to which the ends of the side guards are attached.

4. A metallic formed mattress comprising a bottom and side guards extending longitudinally of such bottom, coil springs holding such side guards under longitudinal tension, and upstanding lugs spaced apart at each end of each side guard and to which such coil springs and side guards are connected.

5. A metallic formed mattress comprising a bottom and side guards extending longitudinally of such bottom, coil springs holding such side guards under longitudinal tension, and upstanding lugs spaced apart at each end of each side guard and to which such coil springs and side guards are connected, the opposed lugs at the immediate ends of the side guards being connected by a rigid strap.

6. A metallic formed mattress comprising a bottom connected to transverse members at the head and foot of the mattress, side guards extending along the longitudinal edges of said bottom, lugs to which the side guards are attached, lugs projecting above the transverse members, and springs between the lugs of the transverse members and the lugs to which the side guards are attached for holding the side guards under longitudinal tension.

7. A metallic formed mattress comprising a bottom connected to transverse irons at the head and foot of the mattress, metallic formed side guards extending along the longitudinal edges of said bottom, and lugs projecting above the transverse irons and coil springs connected with said lugs and to which the ends of the side guards are attached for holding the side guards under longitudinal tension.

8. A metallic formed mattress comprising a bottom connected to transverse irons at the head and foot of the mattress, metallic fabric side guards extending along the longitudinal edges of said bottom and attached at their lower edges thereto, and shorter than the distance between such transverse irons, upright lugs to which the side guards are attached, lugs projecting above the transverse irons, and coil springs between the lugs of the transverse irons and the lugs to which the side guards are attached for holding the side guards under longitudinal tension.

9. A woven wire mattress comprising a bottom, coil springs connecting the bottom to transverse irons at the head and foot of the mattress, bent up side guards forming extensions of such bottom, upright lugs secured to the bottom and to which the side guards are attached, auxiliary lugs projecting above the transverse irons, and coil springs between the lugs attached to the mattress and the lugs attached to the transverse irons for holding the side guards under longitudinal tension.

10. A metallic formed mattress comprising a bottom connected to transverse irons at the ends of the mattress, side guards for preventing the spreading of a stuffed mattress and extending along the longitudinal edges of such bottom and each comprising a flexible metallic fabric, and means for supporting such side guards in an upright position, said side guards having means for holding them under lengthwise tension and effective to automatically take up the slack of such guards and hold them in their upright positions.

11. A metallic formed mattress comprising a bottom connected to transverse irons at the ends of the mattress, metallic fabric side guards extending along the longitudinal edges of said bottom and shorter than the distance between such transverse irons, and coiled springs connected to the ends of the guards for exerting a lengthwise pull thereon thereby to maintain them under a constant longitudinal tension.

12. A metallic formed mattress comprising a bottom connected to transverse irons at the head and foot of the mattress, side guards extending along the longitudinal edges of said bottom and shorter than the distance between such transverse irons, coil springs for holding such side guards under longitudinal tension, and upstanding lugs spaced apart at the end of each side guard and between which one or more coil springs are located and to one of which lugs the end of a side guard is also connected.

13. A woven wire mattress comprising a bottom and woven wire bent up side guards forming extensions of the bottom and each provided with a reinforced upper edge, and means for holding said side guards in an upright position and under longitudinal tension.

14. A woven wire mattress comprising a bottom having enlarged edges at each longitudinal side thereof, bent up woven wire side guards forming extensions of the wire mattress and each provided with an enlarged upper edge, and means for holding the side guards in an upright position and under a constant longitudinal tension.

15. A metallic formed mattress connected to transverse irons at the head and foot of the mattress and provided with side guards along its longitudinal edges, lugs to which the side guards are attached, lugs projecting above the transverse irons, and springs between the lugs of the transverse irons and the lugs to which the side guards are attached, said side guards having reinforced upper edges.

16. A metallic formed mattress connected to transverse irons at the head and foot of the mattress and provided with side guards along its longitudinal edges, lugs to which the side guards are attached, lugs projecting above the transverse irons, and springs between the lugs of the transverse irons and the lugs to which the side guards are attached, said side guards having reinforced upper edges and said mattress having reinforced edges adjacent to the lower edges of the side guards.

17. A woven wire mattress connected to transverse irons at the head and foot of the mattress, bent up side guards forming extensions of the body or web of the mattress, upright lugs secured to the mattress and to which the side guards are attached, auxiliary lugs projecting above the transverse irons, and coil springs between the lugs attached to the mattress and the lugs attached to the transverse irons, said side guards having reinforced upper edges.

18. A woven wire mattress, coil springs connecting the mattress to transverse irons at the head and foot of the mattress, bent up side guards forming extensions of the body or web of the mattress, upright lugs secured to the mattress and to which the side guards are attached, auxiliary lugs projecting above the transverse irons, and coil springs between the lugs attached to the mattress and the lugs attached to the transverse irons, said mattress having reinforced edges adjacent to the lower edges of the side guards and said side guards having reinforced upper edges.

19. A metallic mattress comprising a bottom made up of a metallic fabric and a transverse member at each end thereof to which said fabric is connected, upstanding projections secured to the bottom to project above the same, one adjacent to each corner thereof, and side guards for preventing the spreading of a stuffed mattress, each of only one thickness of flexible metallic fabric secured to said projections under lengthwise tension.

20. A metallic mattress comprising a bottom made up of a metallic fabric and a transverse member at each end thereof to which said fabric is connected, upstanding projections secured to the bottom to project above the same, one adjacent to each corner thereof, and side guards for preventing the spreading of a stuffed mattress, each of a flexible metallic fabric and of unchanneled formation secured to said projections under lengthwise tension and each of less height than the normal or standard thickness of a stuffed mattress.

21. A metallic formed mattress comprising a bottom connected to transverse irons at the ends of the mattress, side guards for preventing the spreading of a stuffed mattress, extending along the longitudinal edges of such bottom and each comprising a flexible metallic fabric, coiled springs for exerting a constant lengthwise pull on such fabric and automatically take up the slack thereof thereby to maintain such side guards under a constant lengthwise tension, and upstanding projections for maintaining such side guards in an upright position.

22. A metallic mattress comprising a bottom and flexible metallic fabric side guards for preventing the spreading of a stuffed mattress, each of only one thickness of fabric extending lengthwise of the side edges of such bottom and each provided with a free enlarged upper edge in substantially the same vertical plane as and parallel to the bottom edge of the side guard, and upstanding projections for holding said side guards stretched therebetween and in an upright position under lengthwise tension.

23. A metallic mattress comprising a bottom and woven wire side guards for preventing the spreading of a stuffed mattress, each of unchanneled formation extending lengthwise of the side edges of such bottom and having connection therewith, each comprising a single thickness of fabric provided with an enlarged upper edge of greater thickness than the thickness of the fabric of the side guard and effective to reinforce and strengthen the side guard, and upstanding projections for holding said side guards stretched therebetween and in an upright position.

24. A metallic mattress comprising a bottom made up of a metallic fabric and a transverse member at each end thereof to which said fabric is connected, upstanding projections secured to said bottom to project above the same one adjacent to each corner thereof, and side guards for preventing the spreading of a stuffed mattress, each of only one thickness of flexible metal fabric secured to said projections under lengthwise tension and not substantially higher than the plane of the stuffed mattress.

Signed at 9 to 15 Murray st., New York, N. Y., this 10th day of June, 1909.

CHARLES J. WITZEL.

Witnesses:

C. F. WEED,

F. E. BOYCE.

Disclaimer in Letters Patent Reissue No. 13,125.

DISCLAIMER.

13,125. (Reissue.)—*Charles J. Witzel*, New York, N. Y. WIRE MATTRESS.

Patent dated June 28, 1910. Disclaimer filed April 1, 1916, by the patentee.

Enters this disclaimer—

"As to the combination specified in claim 23, except when the fabric is stretched under lengthwise tension."

[*Official Gazette, April 11, 1916.*]